(12) United States Patent
Waryas et al.

(10) Patent No.: US 6,714,911 B2
(45) Date of Patent: Mar. 30, 2004

(54) SPEECH TRANSCRIPTION AND ANALYSIS SYSTEM AND METHOD

(75) Inventors: Carol Waryas, San Antonio, TX (US); Pam Parmer, San Antonio, TX (US); Jan C. Laurent, San Antonio, TX (US); Laurie Labbe, San Antonio, TX (US)

(73) Assignee: Harcourt Assessment, Inc., San Antonio, TX (US)

( * ) Notice: Subject to any disclaimer, the term of this patent is extended or adjusted under 35 U.S.C. 154(b) by 0 days.

(21) Appl. No.: 09/999,249

(22) Filed: Nov. 15, 2001

(65) Prior Publication Data

US 2002/0120441 A1 Aug. 29, 2002

Related U.S. Application Data

(63) Continuation-in-part of application No. 09/769,776, filed on Jan. 25, 2001, which is a continuation-in-part of application No. 09/770,093, filed on Jan. 25, 2001.

(51) Int. Cl.[7] .......................... G10L 21/06; G09B 21/00
(52) U.S. Cl. .......................... 704/271; 704/220
(58) Field of Search ........................ 706/927; 704/504, 704/503, 3, 276, 271, 270, 268, 267, 260, 256, 254, 249, 240, 231, 211, 200; 434/362, 185

(56) References Cited

U.S. PATENT DOCUMENTS

| | | | |
|---|---|---|---|
| 4,969,194 A | 11/1990 | Ezawa et al. | |
| 5,303,327 A | 4/1994 | Sturner et al. | |
| 5,393,236 A | 2/1995 | Blackmer et al. | |
| 5,487,671 A | 1/1996 | Shpiro et al. | |
| 5,562,453 A | 10/1996 | Wen | |
| 5,636,325 A | 6/1997 | Farrett | |
| 5,679,001 A | 10/1997 | Russell et al. | |
| 5,717,828 A | 2/1998 | Rothenberg | |
| 5,791,904 A | 8/1998 | Russell et al. | |
| 5,813,862 A | 9/1998 | Merzenich et al. | |
| 5,832,441 A | 11/1998 | Aaron et al. | |
| 5,857,173 A | 1/1999 | Beard et al. | |
| 5,865,626 A | 2/1999 | Beattie et al. | |

(List continued on next page.)

FOREIGN PATENT DOCUMENTS

| | | |
|---|---|---|
| EP | 0 360 909 | 4/1990 |
| EP | 0 504 927 | 9/1992 |
| EP | 1 089 246 | 4/2001 |
| WO | 99/13446 | 3/1999 |

OTHER PUBLICATIONS

Bernthal, John, et al. "Articulation and Phonlogical Disorders," 1998, Allyan & Bacon, 4th Edition, pp. 233–236, 292.*

(List continued on next page.)

*Primary Examiner*—Richemond Dorvil
*Assistant Examiner*—V. Paul Harper
(74) *Attorney, Agent, or Firm*—Allen, Dyer, Doppelt, Milbrath & Gilchrist, P.A.

(57) ABSTRACT

A transcription method uses a computerized process to prompt a student to produce at least one phoneme orally. Next a correct and at least one incorrect production of the phoneme are displayed. The therapist selects from among the displayed productions based upon the student-produced phoneme. The system includes a processor and display to prompt a student to produce at least one phoneme orally, display a correct and at least one incorrect production of the phoneme. The therapist then uses an input device in signal communication with the processor to select from among the displayed correct and incorrect productions based upon the student-produced phoneme, thus obviating the need for the therapist to enter the incorrect production symbol by symbol, unless it is desired to do so, or unless the actual production is not found among the displayed production selections.

37 Claims, 25 Drawing Sheets

U.S. PATENT DOCUMENTS

| | | | |
|---|---|---|---|
| 5,927,988 | A | 7/1999 | Jenkins et al. |
| 6,009,397 | A | 12/1999 | Siegel |
| 6,019,607 | A | 2/2000 | Jenkins et al. |
| 6,030,226 | A | 2/2000 | Hersh |
| 6,055,498 | A | 4/2000 | Neumeyer et al. |
| 6,071,123 | A | 6/2000 | Tallal et al. |
| 6,077,085 | A | 6/2000 | Parry et al. |
| 6,113,393 | A | 9/2000 | Neuhaus |

OTHER PUBLICATIONS

Jackson, Peter, "Introduction to Expert Systems," 1999, Addison Wesley Longman Limited, 3rd Edition, pp. 207–210.*

Parrot Software User's Manual "Automatic Articulation Analysis 2000," Parrot Software, Inc.*

Shneiderman, John, "Designing the User Interface," 1998, Addison Wesley Lognman Limited, 3rd Edition, pp. 82–83.*

American Speech–Language–Hearing Association, Technology 2000: Clinical Applications for Speech–Language Pathology, http://professional.asha.org/tech_resources/tech2000/7.htm, pp. 1–7, 1996.

PictureGallery, http://www.psychcorp.com/catalogs/sla/sla014atpc.htm, pp. 1–2.

The Childes System, Child Language Data Exchange System, http://childes.psy.cmu.edu.

Additional Childes Tools, Childes Windows Tools, http://childes.psy.cmu.edu/html/wintools.html.

Sails, the Speech Assessment & Interactive Learning System (SAILS™) Using SAILS in Clinical Assessment and Treatment, http://www.propeller.net/react/sails2.htm, pp. 1–3.

GFTA–2: Goldman–Fristoe Test of Articulation–2, http://www.agsnet.com/templates/productview_p.asp?GroupID=a11750, pp. 1–3.

KLPA: Khan–Lewis Phonological Analysis, http://www.agsnet.com/templates/productview_p.asp?GroupID=a1820, pp. 1–2.

Bernthal, John E., and Bankson, Nicholas W. (Eds.), *Articulation and Phonological Disorders*, Fourth Edition, Chapter 9, Instrumentation in Clinical Phonology, by Julie J. Masterson, Steven H. Long, and Eugene H. Buder, 1998, pp. 378–406.

Masterson, Julie and Pagan, Frank, "Interactive System for Phonological Analysis User's Guide," pps 41, Harcourt Brace & Compnay, San Antonio, 1993.

Long, Steven H. and FEY, Marc E., "Computerized Profiling User's Manual," pps 119, Harcourt Brace & Company, San Antonio, 1993.

* cited by examiner

[Current Date]

Dear [Caregiver's Name]:

RE:  Client's Name [First and Last Name]

[Client's First Name] was tested on [Date of Administration] with the Computerized Articulation and Phonology Evaluation System to see what sounds he/she [based on SEX] is able and unable to say. [Client's First Name] was shown, for example, a photograph of a shoe on the computer screen and was asked to tell me what the photo was. This was not a test to determine if [Client's First Name] knew the word, but rather how he/she [based on SEX] said it. The results of this evaluation indicate whether [Client's First Name] is able to say all the sounds that are expected at his/her [based on SEX] age. The evaluation also indicates whether [Client's first name] is using sounds early for his/her [based on SEX] age [If the age filter is turned on and if the client is less than 10 years of age].

Here are [Client's First Name]'s results:
These are the sounds your child is able to say correctly, which are not expected at his/her [based on SEX] age: [If the age filter is turned on and if client is less than 10 years of age]
[For Example]

| Sound | Position of the Sound in Words | | |
|---|---|---|---|
| | Initial | Medial | Final |
| B | | | ✓ |
| F | ✓ | | |
| T | | ✓ | |

These are the sounds with which [Client's first name] is having difficulty:
[For Example]

| Sound | Position of the Sound in Words | | |
|---|---|---|---|
| | Initial | Medial | Final |
| G | | | ✓ |
| H | ✓ | | |
| R | | ✓ | |

[All letters in the "Sound:" column should be in orthographic, small letters, not in CAPS]
Note:   Results reflect application of the age filter [If age filter was used]
        Results reflect application of the dialect filter [If dialect filter was used]
        [Do not print any note text if filters were not used.]

[Print the following if there are no sounds with which the client is having difficulty]
        [Client]'s test results do not indicate that he/she [based on SEX] has difficulty with articulation and/or phonology at this time.

FIG. 9.

Treatment Suggestions for
[Client's First Name and Last Name]
[mm/dd/yyyy-Administration date]

This report is fairly general in its approach to final goal selection because there is considerable controversy in the field of speech/language pathology about articulation and phonology treatment. In addition, it is important to consider the whole client, in his or her environment, and in the context of other communication or learning needs and styles when determining the goals of treatment.
Be sure to select the option of an age comparison (this would have to be set in the Preferences) and/or a dialect filter (this would have to be set in the Demographics screen) if you choose to take into account those considerations in goal selection.

I. Word Shape Goals

Your client is having difficulty with the shape of words. The priority at this point in development should be to strengthen the basic word structures of language. The following is a list of word shapes to target in treatment:
[System displays word shapes with a percent match less than 60% from *Comparison of Client's Production and Target Forms.*]

CVCVC
CVC
CCVCC

When targeting these word shapes, it is advisable to use sounds that are in your client's current inventory. For example, if a child uses only CV syllables and [p], [m], and [n] word initially, you can create CVC words such as 'pop,' 'mop,' 'pan,' etc.

[System displays the following paragraph if no word shape has a match rate of less than 60%. Previous two paragraphs with the 60% or less match data is not printed.]
Your client shows adequate word shape development at the present time, however, there are many segmental substitutions. Treatment should focus on segments in all word positions. Consider three to four major sound classes varying in place, manner and voicing.

Your client produced these sounds with a relatively high degree of accuracy in the noted positions:
[System displays consonant segments produced with at least 70% match in at least one word position from the segmental part of the Comparison of Client's Production and Target Forms.]

| Initial | Medial | Final |
|---|---|---|
| T (70%)<br>C (95%)<br>P (71%)<br>G (85%)<br>BL (75%) | T (100%)<br>P (99%) | T (90%)<br>P (76%) |

FIG. 11A.

[Print this paragraph if the match rate of >70% does not apply. Previous paragraph and table are not printed.]
No segments meet the 70% criterion for match. For phonemes to utilize for word shape goals, select phonemes with the highest match below 70% (as identified in the analyses comparing client and target productions.)

Your client seems to overuse the following phonemes. He/she should be encouraged to use sounds other than these:
    [If results from Description of Client's Production indicate that one consonant segment occurs over 25 times in the word initial position, over 12 times in the medial position, or over 17 times in the final position. If none of the segments meet these criteria, omit this section including the previous paragraph.]

| Initial | Medial | Final |
|---|---|---|
| T | T<br>P | T<br>P |

[Print this on all IPE Level 1 Treatment Suggestions.]
It is usually advisable at this stage of development to avoid targeting voiced stops in the final position unless your client already shows use of these sounds in the final position.

II.    Segmental and/or Feature Goals

Your client might also benefit from treatment on one or two new sounds or features in the first period of treatment. The following is a list of sounds and features that were produced with less than 60% accuracy:
[From the segmental part of the Comparison of Client's Production and Target Forms:
    a. List all target consonant segments and consonant sequences by position with percent match less than 60%.
b. List all place, voice, manner features with percent match less than 60%.
c. List all nonlinear features with percent match less than 60%.
**List all phonemes in IPA characters.]

Segments

| Initial | Medial | Final |
|---|---|---|
| k (50%)<br>g (59%)<br>f (0%)<br>v (0%)<br>th (0%)<br>th (0%)<br>s (0%)<br>z (0%)<br>sh (0%)<br>ch (30%)<br>J (30%)<br>r (0%) | k (55%)<br>g (59%)<br>NG (40%)<br>f (0%)<br>v (0%)<br>th (0%)<br>th (0%)<br>s (0%)<br>z (0%)<br>sh (0%)<br>ch (30%)<br>J (30%)<br>r (0%) | f (0%)<br>v (0%)<br>th (0%)<br>th (0%)<br>s (0%)<br>z (0%)<br>sh (0%)<br>ch (30%)<br>J (30%)<br>r (0%) |

FIG. 11B.

Place-Voice-Manner Features

Place

| Initial | Medial | Final |
|---|---|---|
| Labiodental (0%)<br>Dental (0%)<br>Palatal (25%)<br>Velar (53%)<br>Labiodental Velar (43%) | Labiodental (0%)<br>Dental (0%)<br>Palatal (25%)<br>Velar (50%) | Labiodental (0%)<br>Dental (0%)<br>Palatal (25%)<br>Labiodental Palatal (34%) |

Voice

| Initial | Medial | Final |
|---|---|---|
| (none) | Voiced (35%) | Voiceless (59%) |

Manner

| Initial | Medial | Final |
|---|---|---|
| Fricative (0%)<br>Afficate (30%)<br>Liquid (45%)<br>Affricate Liquid (25%) | Fricative (0%)<br>Afficate (30%)<br>Liquid (45%) | Fricative (0%)<br>Afficate (30%)<br>Liquid (45%)<br>Affricate Liquid (25%) |

Nonlinear Features

Manner

| Initial | Medial | Final |
|---|---|---|
| Consonantal + (35%) | Consonantal + (45%) | Consonantal + (49%) |
| Consonantal - (35%) | Consonantal - (45%) | Consonantal - (49%) |
| Sonorant + (58%) | Sonorant - (59%) | Sonorant + (49%) |
| Continuant + (0%) | Continuant -+ (45%) | Nasal - (43%) |
| Nasal - (59%) | | Consonantal - Nasal + (15%) |
| Consonantal + Nasal - (50%) | | |

Laryngeal

| Initial | Medial | Final |
|---|---|---|
| Voiced + (58%) | Voiced + (59%) | Voiced + (52%) |
| Spread Glottis - (12%) | Spread Glottis + (0%) | Spread Glottis - (5%) |
| Voiced + Spread Glottis - (0%) | Voiced - Spread Glottis + (10%) | Voiced + Spread Glottis + (10%) |

FIG. 11C.

Oral Place

| Initial | Medial | Final |
|---|---|---|
| Labial Coronal Anterior + (15%) | Labial Coronal Anterior - (0%) | Labial Coronal Anterior -+ (1 |
| Labialdental + Dorsal Anterior - (10%) | | |

Pharyngeal Place

| Initial | Medial | Final |
|---|---|---|
| Advanced Tongue Root + (58%) Advanced Tongue Root + Advanced Tongue Root + (14%) | Advanced Tongue Root - (13%) | Advanced Tongue Root + (14 Advanced Tongue Root + Advanced Tongue Root + (19 |

[For each sound listed under the Target mismatch sounds, system will check the Description of Client's Production results to see whether that sound was present or not. For those sounds that WERE used at least once in any position. If none of the sounds meet the criterion, omit this section including the following 3 paragraphs.]

The following target sounds were present in your client's phonetic inventory, which indicates that she or he is able to produce that sound or feature:

| Initial | Medial | Final |
|---|---|---|
| T | P | T |
| | | P |

If you choose to target these sounds in treatment, you might consider using minimal pairs in order to encourage further use of the sound or feature by providing a communicative incentive. Consult the *Comparison of Client's Production and Target Forms Report* to determine which sounds are used most often as substitutions for the target sound class and use those sounds in minimal pair contrasts.

Although the target sounds were present in the inventory, it is possible that additional drill and practice will be necessary to establish automaticity of production.

[For each sound listed under the Target mismatch sounds, system will check the Description of Client's Production results to see whether that sound was present or not. List those sounds that WERE NOT used at least once in any position. If none of the sounds meet the criterion, omit this section including the following 3 paragraphs.]

The following sounds were absent from your client's phonetic inventory:

| Target |
|---|
| R |

FIG. 11D.

If you choose to target these sounds in treatment, you may first need to teach the client how to produce these sounds, and then work to establish automaticity. You may wish to conduct stimulability testing for these sounds and use the results to select the sounds to target first in treatment.

Target the sounds or features in word positions that the client already uses well (e.g., initial position if your client uses CV well). It is often advisable to address problematic sequences of sounds or features after sequences that show no mismatches.

[Print this on all IPE Level I Treatment Suggestions.]
Choose sounds that differ in both place and manner and focus on sound class category (e.g., [v] and [s] as fricatives, rather than just [f], or [k] and [g] as velars, rather than just [k]) to establish a broad basis for change.

Additionally, you may wish to consider whether other accurately produced sounds have features in common with the mismatched sounds. It may be possible to teach the new sounds by extension from the already produced sounds (e.g., from /t/ to /k/, from /s/ to /z/, etc.).

FIG. 11E.

Treatment Suggestions for
[Client's First Name and Last Name]
[mm/dd/yyyy - Administration date]

This report is fairly general in its approach to final goal selection because there is considerable controversy in the field of speech/language pathology about articulation and phonology treatment. In addition, it is important to consider the whole client, in his or her environment, and in the context of other communication or learning needs and styles when determining the goals of treatment.

Be sure to select the option of an age comparison (this would have to be set in the Preferences) and/or a dialect filter (this would have to be set in the Demographics screen) if you choose to take into account those considerations in goal selection.

I.  Word Shape Goals

Your client is having difficulty with more complex structures of words that involve consonant sequences (blends) and longer sequences of consonants and vowels. The following is a list of word shapes to target in treatment:
[System displays word shapes with a percent match <u>less</u> than 60% from Comparison of Client's Production and Target Forms.]

CVCVC
    CVC
    CCVCC

When targeting these word shapes, it is often advisable to use sounds that are in your client's current inventory.

[System displays the following paragraph if no word shape has a match rate of less than 60%. Previous two paragraphs with the 60% or less match data is not printed.]
Your client shows adequate word shape development at the present time, however, there are many segmental substitutions. Treatment should focus on segments in all word positions. Consider three to four major sound classes varying in place, manner and voicing.

Your client produced these sounds with a relatively high degree of accuracy in the noted positions:
    [System displays consonant segments produced with <u>at least</u> 70% match in at least one word position from the segmental part of the Comparison of Client's Production and Target Forms.]

| Initial | Medial | Final |
|---|---|---|
| T (79%)<br>C (99%)<br>P (100%)<br>G (70%)<br>BL (85%) | T (99%)<br>P (85%) | T (100%)<br>P (100%) |

FIG. 12A.

[Print this paragraph if the match rate of >70% does not apply. Previous paragraph and table are not printed.]
No segments meet the 70% criterion for match. For phonemes to utilize for word shape goals, select phonemes with the highest match below 70% (as identified in the analyses comparing client and target productions.)

Your client seems to overuse the following phonemes. He/she should be encouraged to use sounds other than these:
    [If results from Description of Client's Production indicate that one consonant segment occurs over 25 times in the word initial position, over 12 times in the medial position, or over 17 times in the final position. If none of the segments meet these criteria, omit this section including the previous paragraph.]

| Initial | Medial | Final |
|---|---|---|
| T | T<br>P | T<br>P |

II.     Segmental and/or Feature Goals

Your client also shows limitations in speech sound development. The following is a list of sounds and features that were produced with less than 60% accuracy:
[From the segmental part of the Comparison of Client's Production and Target Forms:
a. List all target consonant segments and consonant sequences by position with percent match less than 60%.
b. List all place, voice, and manner features with percent match less than 60%.
c. List all nonlinear features with percent match less than 60%.
**List all phonemes in IPA characters.]

1. Segments

| Initial | Medial | Final |
|---|---|---|
| k (50%)<br>g (59%)<br>f (0%)<br>v (0%)<br>th (0%)<br>th (0%)<br>s (0%)<br>z (0%)<br>sh (0%)<br>ch (30%)<br>J (30%)<br>r (0%) | k (55%)<br>g (59%)<br>NG (40%)<br>f (0%)<br>v (0%)<br>th (0%)<br>th (0%)<br>s (0%)<br>z (0%)<br>sh (0%)<br>ch (30%)<br>J (30%)<br>r (0%) | f (0%)<br>v (0%)<br>th (0%)<br>th (0%)<br>s (0%)<br>z (0%)<br>sh (0%)<br>ch (30%)<br>J (30%)<br>r (0%) |

FIG. 12B.

2. Place - Voice - Manner Features

Place

| Initial | Medial | Final |
|---|---|---|
| Labiodental (0%)<br>Dental (0%)<br>Palatal (25%)<br>Velar (53%)<br>Labiodental Velar (43%) | Labiodental (0%)<br>Dental (0%)<br>Palatal (25%)<br>Velar (50%) | Labiodental (0%)<br>Dental (0%)<br>Palatal (25%)<br>Labiodental Palatal (34%) |

Voice

| Initial | Medial | Final |
|---|---|---|
| (none) | Voiced (35%) | Voiceless (59%) |

Manner

| Initial | Medial | Final |
|---|---|---|
| Fricative (0%)<br>Afficate (30%)<br>Liquid (45%)<br>Affricate Liquid (25%) | Fricative (0%)<br>Afficate (30%)<br>Liquid (45%) | Fricative (0%)<br>Afficate (30%)<br>Liquid (45%)<br>Affricate Liquid (25%) |

3. Nonlinear Features

Manner

| Initial | Medial | Final |
|---|---|---|
| Consonantal + (35%) | Consonantal + (45%) | Consonantal + (49%) |
| Consonantal - (35%) | Consonantal - (45%) | Consonantal - (49%) |
| Sonorant + (58%) | Sonorant - (59%) | Sonorant + (49%) |
| Continuant + (0%) | Continuant -+ (45%) | Nasal - (43%) |
| Nasal - (59%) | | Consonantal - Nasal + (15%) |
| Consonantal + Nasal - (50%) | | |

Laryngeal

| Initial | Medial | Final |
|---|---|---|
| Voiced + (58%) | Voiced + (59%) | Voiced + (52%) |
| Spread Glottis - (12%) | Spread Glottis + (0%) | Spread Glottis - (5%) |
| Voiced + Spread Glottis - (0%) | Voiced - Spread Glottis + (10%) | Voiced + Spread Glottis + (10%) |

FIG. 12C.

Oral Place

| Initial | Medial | Final |
|---|---|---|
| Labial Coronal Anterior + (15%) | Labial Coronal Anterior - (0%) | Labial Coronal Anterior -+ (19%) |
| Labialdental + Dorsal Anterior - (10%) | | |

Pharyngeal Place

| Initial | Medial | Final |
|---|---|---|
| Advanced Tongue Root + (58%)<br>Advanced Tongue Root +<br>Advanced Tongue Root + (14%) | Advanced Tongue Root - (13%) | Advanced Tongue Root + (14%)<br>Advanced Tongue Root +<br>Advanced Tongue Root + (19%) |

[For each sound listed under the Target mismatch sounds, system will check the Description of Client's Production results to see whether that sound was present or not. For those sounds that WERE used at least once in any position. If none of the sounds meet the criterion, omit this section including the following 3 paragraphs.]

The following target sounds were present in your client's phonetic inventory, which indicates that she or he is able to produce that sound or feature:

| Initial | Medial | Final |
|---|---|---|
| T | P | T |
| | | P |

If you choose to target these sounds in treatment, you might consider using minimal pairs in order to encourage further use of the sound or feature by providing a communicative incentive. Consult the *Comparison of Client's Production and Target Forms Report* to determine which sounds are used most often as substitutions for the target sound class and use those sounds in minimal pair contrasts. If there is variability between words for a given sound or feature, and/or a number of assimilations or metatheses, there may be constraints on sequences of sounds or features. Check the sequence section of the *Comparison of Client Production and Target Forms Report*. Address sequence difficulties separately in treatment.

Although the target sounds were present in the inventory, it is possible that additional drill and practice will be necessary to establish automaticity of production.

[For each sound listed under the Target mismatch sounds, system will check the Description of Client's Production results to see whether that sound was present or not. List those sounds that WERE NOT used at least once in any position. If none of the sounds meet the criterion, omit this section including the following 3 paragraphs.]

The following sounds were absent from your client's phonetic inventory:

| Target |
|---|
| R |

FIG. 12D.

If you choose to target these sounds in treatment, you may first need to teach the client how to produce these sounds, and then work to establish automaticity. You may wish to conduct stimulability testing for these sounds and use the results to select the sounds to target first in treatment.

Additionally, you may wish to consider whether other accurately produced sounds have features in common with the mismatched sounds. It may be possible to teach the new sounds by extension from the already produced sounds (e.g., from /l/ to /r/, from /s/ to /z/, etc.).

[Print this section on all IPE Level 2 Treatment Suggestions.]

Choose sounds that differ in both place and manner and focus on sound class category (e.g., [v] and [s] as fricatives, rather than just [f], or [k] and [g] as velars, rather than just [k]) to establish a broad basis for change.

FIG. 12E.

> Treatment Suggestions for
> [Client's First Name and Last Name]
> [mm/dd/yyyy - Administration date]
>
> This report is fairly general in its approach to final goal selection because there is considerable controversy in the field of speech/language pathology about articulation and phonology treatment. In addition, it is important to consider the whole client, in his or her environment, and in the context of other communication or learning needs and styles when determining the goals of treatment.
> Be sure to select the option of an age and/or a dialect filter (this would have to be set in the Preferences) if you choose to take into account those considerations in goal selection.
>
> I.  Segmental Goals
>
> Your client has mastered most of the basic English word shapes; however these specific sounds showed mismatches:
> [System lists the consonant and consonant sequence sounds with percent match <u>less</u> than 60% from Comparison of Client's Production and Target Forms results.]
>
> | Initial | Medial | Final |
> |---|---|---|
> | T (50%) | T (59%) | P (18%) |
> | P (43%) | P (15%) | R (0%) |
> | R (0%) | R (0%) | |
>
> Note: In general, it is advisable to examine the feature analyses in order to determine whether there are common substitution or deletion patterns that apply across more than one of the mismatched segments. It is often advisable to work with groups of sounds rather than individual sounds, to promote generalization.
>
> [For each sound listed under the Target mismatch sounds, system will check the Description of Client's Production results to see whether that sound was present or not. For those sounds that WERE used at least once in any position. If none of the sounds meet the criterion, omit this section including the following 3 paragraphs.]
> The following target sounds were present in your client's phonetic inventory, which indicates that she or he is able to produce that sound or feature:
>
> | Initial | Medial | Final |
> |---|---|---|
> | T | P | T |
> | | | P |
>
> If you choose to target these sounds in treatment, you may consider using minimal pairs in order to encourage further use of the sound or feature by providing a communicative incentive. Consult the *Comparison of Client's Production and Target Forms Report* to determine which sounds are used most often as substitutions for the target sound class and use those sounds in minimal pair contrasts.
>
> Although the target sounds were present in the inventory, it is possible that additional drill and practice will be necessary to establish automaticity of production.

FIG. 13A.

[For each sound listed under the Target mismatch sounds, system will check the Description of Client's Production results to see whether that sound was present or not. List those sounds that WERE NOT used at least once in any position. If none of the sounds meet the criterion, omit this section including the following 3 paragraphs.]

The following sounds were absent from your client's phonetic inventory:

| Target |
|---|
| R |

If you choose to target these sounds in treatment, you may first need to teach the client how to produce these sounds, and then work to establish automaticity. You may wish to conduct stimulability testing for these sounds and use the results to select the sounds to target first in treatment.

Additionally, you may wish to consider whether other accurately produced sounds have features in common with the mismatched sounds. It may be possible to teach the new sounds by extension from the already produced sounds (e.g., from /l/ to /r/, from /s/ to /z/, etc.).

FIG. 13B.

Treatment Suggestions for
[Client's First Name and Last Name]
[mm/dd/yyyy - Administration date]

This report is fairly general in its approach to final goal selection because there is considerable controversy in the field of speech/language pathology about articulation and phonology treatment. In addition, it is important to consider the whole client, in his or her environment, and in the context of other communication or learning needs and styles when determining the goals of treatment.

Be sure to select the option of an age and/or a dialect filter (this would have to be set in the Preferences) if you choose to take into account those considerations in goal selection.

I.  Stress Pattern Goals

Your client has the basic structures and segments of English, but shows reduction of multisyllabic words or other stress-related phonological processes (e.g., difficulties with certain segmental or feature sequences in certain stress patterns). You might consider targeting four or five of these stress patterns initially in treatment.

[Identify any stress patterns with a percent match less than 60% from Comparison of Client's Production and Target Forms results.]

1-2-3-3
2-1-3-2-3
2-3-2-4-1-2

It might be advisable for your client to work from shorter to longer words. Target the identified patterns if developmentally appropriate (i.e., words of more than 3 syllables for developmental age of 6 or above).

Note that words starting with weak syllables are usually more difficult in English than words starting with strong syllables.

Consider focusing first on the patterns with sounds that never show mismatches, before targeting patterns with problematic sound sequences.

It is usually helpful to use rhythm and combinations of accurate stress pattern sequences to build the new stress patterns, (e.g., building weak-Strong-weak sequences by adding a weak [quiet, light] syllable to a Strong-weak sequence [loud-quiet syllables], as in, buh [quiet] + NAna [loud-quiet] > baNAna [quiet-loud-quiet]).

FIG. 14.

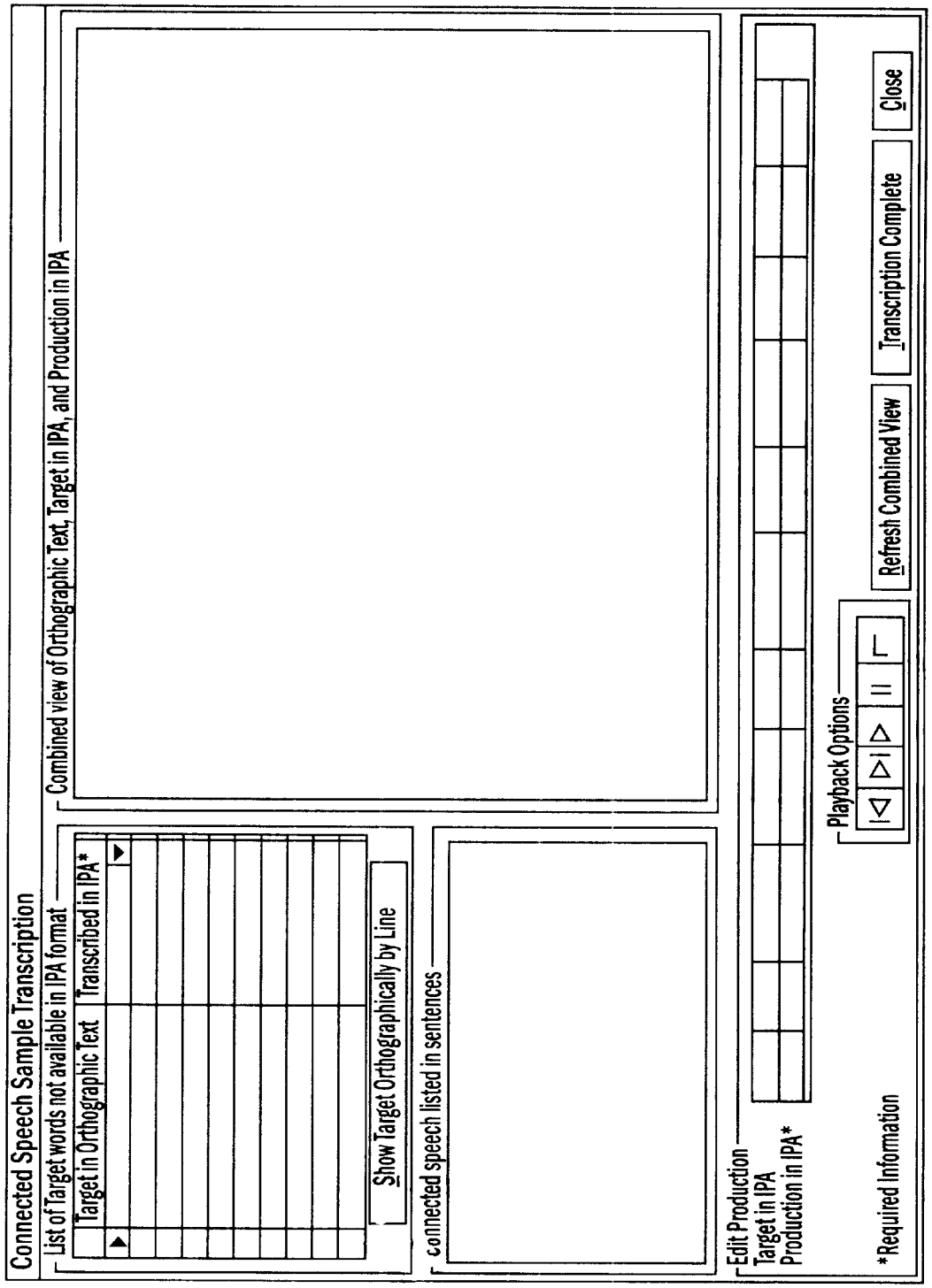

SPEECH TRANSCRIPTION AND ANALYSIS SYSTEM AND METHOD

CROSS-REFERENCE TO RELATED APPLICATION

This application is a continuation-in-part of and claims priority to application Ser. No. 09/769,776, entitled "Speech Analysis and Therapy System and Method," filed Jan. 25, 2001, and application Ser. No. 09/770,093, entitled "Speech Therapy System and Method," filed Jan. 25, 2001, which are commonly owned with the instant application and which are incorporated herein by reference.

BACKGROUND OF THE INVENTION

1. Field of the Invention

The present invention relates to systems and methods for analyzing and remediating speech pathologies, and, more particularly, to such systems and methods that are computer-based.

2. Description of Related Art

Articulation and phonology disorders are the most common of the speech and language disorders. The prevalence of this disorder is, at the time of writing, approximately 10% of the school-age population. In addressing a perceived articulation issue in a student, speech/language pathologists have in the past used an initial test based upon a series of cards. Each card contains a picture and a word, and the student is asked to pronounce the word associated with the card. The pathologist then determines whether the student's pronunciation is "right" or "wrong." It may be recognized that such a system can be cumbersome, owing to the cards' having to be placed in a desired order and sorted manually.

An intervention system designed to automate this process, Picture Gallery I, was presented by the owner of the current application. In this system pictures and/or words stored in a database could be sorted using a desired criterion such as a particular phoneme and presented to the student under software control for facilitating the acquisition or remediation of speech or language skills. No analysis or scoring is performed; rather, the product is intended for use by one or more students, either alone or in concert with a pathologist/teacher.

A previously known method of diagnosing articulation or phonology disorders included a "pencil and paper" test wherein a student is asked to speak a word. The therapist grades the word subjectively, based upon the therapist's ear and the local standards.

Other systems known in the art that address speech/language analysis and therapy methodologies includes those of Neuhaus (U.S. Pat. No. 6,113,393), Parry et al. (U.S. Pat. No. 6,077,085), UCSF and Rutgers (U.S. Pat. Nos. 5,813,862 and 6,071,123), Neumeyer et al. (U.S. Pat. No. 6,055,498), Jenkins et al. (U.S. Pat. Nos. 5,927,988 and 6,019,607), Siegel (U.S. Pat. No. 6,009,397), Beard et al. (U.S. Pat. No. 5,857,173), Aaron et al. (U.S. Pat. No. 5,832,441), Russell et al. (U.S. Pat. Nos. 5,679,001 and 5,791,904), Rothenberg (U.S. Pat. No. 5,717,828), Wen (U.S. Pat. No. 5,562,453), Ezawa et al. (U.S. Pat. No. 4,969,194), Sturner et al. (U.S. Pat. No. 5,303,327), Shpiro (U.S. Pat. No. 5,766,015), and Siegel (U.S. Pat. No. 6,148,286). Commercial software products in the field of articulation, phonology, or speech sound production include SpeechViewer, Interactive System for Phonological Analysis, Speech Master, Visi-pitch, and Computerized Profiling. Commercial print products include the Goldman-Fristoe Test of Articulation (American Guidance Service), Khan-Lewis Test of Phonology (American Guidance Service), Photo Articulation Test (Pro-Ed), and Fisher-Logeman Test of Articulation (Pro-Ed).

SUMMARY OF THE INVENTION

It is therefore an object of the present invention to provide a system and method for eliciting a desired sound from a user.

It is a further object to provide such a system and method adapted to generate a report.

It is another object to provide a system and method for testing a user's articulation.

It is an additional object to provide such a system and method that is adapted to analyze a group of problematic sounds.

It is also an object to provide such a system and method that recommends a therapeutic program responsive to the analysis.

It is yet a further object to provide such a system and method that includes a prescreening feature.

It is yet another object to provide a system and method for facilitating a therapist to transcribe speech of a student/client.

These and other objects are achieved by the present invention, a first aspect of which comprises a method and system for providing speech therapy. The method comprises the steps of selecting a problem speech sound and searching a database that comprises a plurality of records. Each record comprises a picture and a word associated with the word.

Next a set of records is automatically generated from the plurality of records. Each record contains a word specific to the problem speech's sound. The set of records is next automatically presented to a user sequentially on a display device, and the user is prompted to pronounce the displayed word. Finally, the pronunciation of each word is scored.

The system of the first aspect of the present invention comprises a processor, an input device in communication with the processor having means for selecting a problem speech sound, and a display device in communication with the processor. The database as described above is resident on the processor, as are software means. The software is adapted to automatically generate a set of records from the plurality of records, with each record containing a word specific to the problem speech sound. The software is also adapted to automatically present at least a portion of each record in the set of records to a user sequentially on a display device; the set of records to a user sequentially on the display device and to prompt the user to pronounce the displayed word. Finally, the software is adapted to receive via the input device a score for the pronunciation of each word.

Another aspect of the present invention is a system and method for analyzing a speech problem by performing a test of articulation, phonology, and sound features that is administered and analyzed with the use of an electronic processor. This method comprises the steps of presenting to a student/user a symbol representative of a word and prompting the user to pronounce the word represented by the symbol into a microphone in signal communication with a processor. Next the therapist enters a phonetic representation of the user pronunciation into the processor. It is then automatically determined whether an error exists in the user pronunciation. If an error exists, the error is automatically categorized.

In an alternate embodiment of the method, the therapist enters the phonetic representation of the user pronunciation into an input and storage device that is not in signal communication with the processor. At a later time the phonetic representation is downloaded into the processor, whereupon the automatic determining and categorizing steps proceed.

The system of the second aspect of the invention evaluates an articulation disorder. The system comprises a processor and an output device and an input device, each in signal communication with the processor.

Software installable on the processor is adapted to present on the output device, typically a display device, although this is not intended as a limitation, a symbol representative of a word. The software then is adapted to prompt a user via the output device to pronounce the word represented by the symbol and to receive from the therapist via the input device a phonetic representation of the user's pronunciation. The software automatically determines whether an error exists in the user pronunciation, and, if an error exists, automatically categorizes the error.

In the alternate embodiment the system comprises a processor and an output device and a user input device, each in signal communication with the processor. The system further comprises an operator input and storage device that is not in signal communication with the processor, but is connectable thereto for downloading operator-entered data thereinto, the data comprising the phonetic representation.

The software then receives downloaded data from the operator input and storage device the phonetic representation of the user's pronunciation. The software automatically determines whether an error exists in the user pronunciation, and, if an error exists, automatically categorizes the error.

The system and method of this second feature of the invention may be adapted for presentation of a single word, a plurality of words having a predetermined feature desired to be tested, a pretest for screening for potential articulation disorders, and an analysis of connected speech with the use of a moving picture to elicit a narrative from the student.

An additional aspect of the present invention is directed to the transcription of a student's speech by the therapist using a computerized process. This method comprises the steps of prompting the student to produce at least one phoneme orally. Next a correct production of the at least one phoneme is displayed to the therapist, as well as at least one incorrect production of the at least one phoneme. The therapist is then permitted to select from among the displayed correct and incorrect productions based upon the student-produced at least one phoneme.

The system related to this aspect of the invention comprises a processor and display means in signal communication with the processor. The display means are for prompting a student to produce at least one phoneme orally, displaying a correct production of the at least one phoneme to a therapist, and displaying at least one incorrect production of the at least one phoneme to the therapist. The therapist then uses input means in signal communication with the processor to select from among the displayed correct and incorrect productions based upon the student-produced at least one phoneme, thus obviating the need for the therapist to enter the incorrect production symbol by symbol, unless it is desired to do so, or unless the actual production is not found among the displayed production selections.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 9 is an exemplary parent letter report.

FIGS. 11A–11E is an exemplary level 1 treatment suggestion report.

FIGS. 12A–12E is an exemplary level 2 treatment suggestion report.

FIGS. 13A, 13B is an exemplary level 3 treatment suggestion report.

FIG. 14 is an exemplary level 4 treatment suggestion report.

FIG. 15 is an exemplary connected speech sample transcription screen.

DETAILED DESCRIPTION OF THE PREFERRED EMBODIMENTS

A description of the preferred embodiments of the present invention will now be presented with reference to FIGS. 1A–15.

Figure 1A:
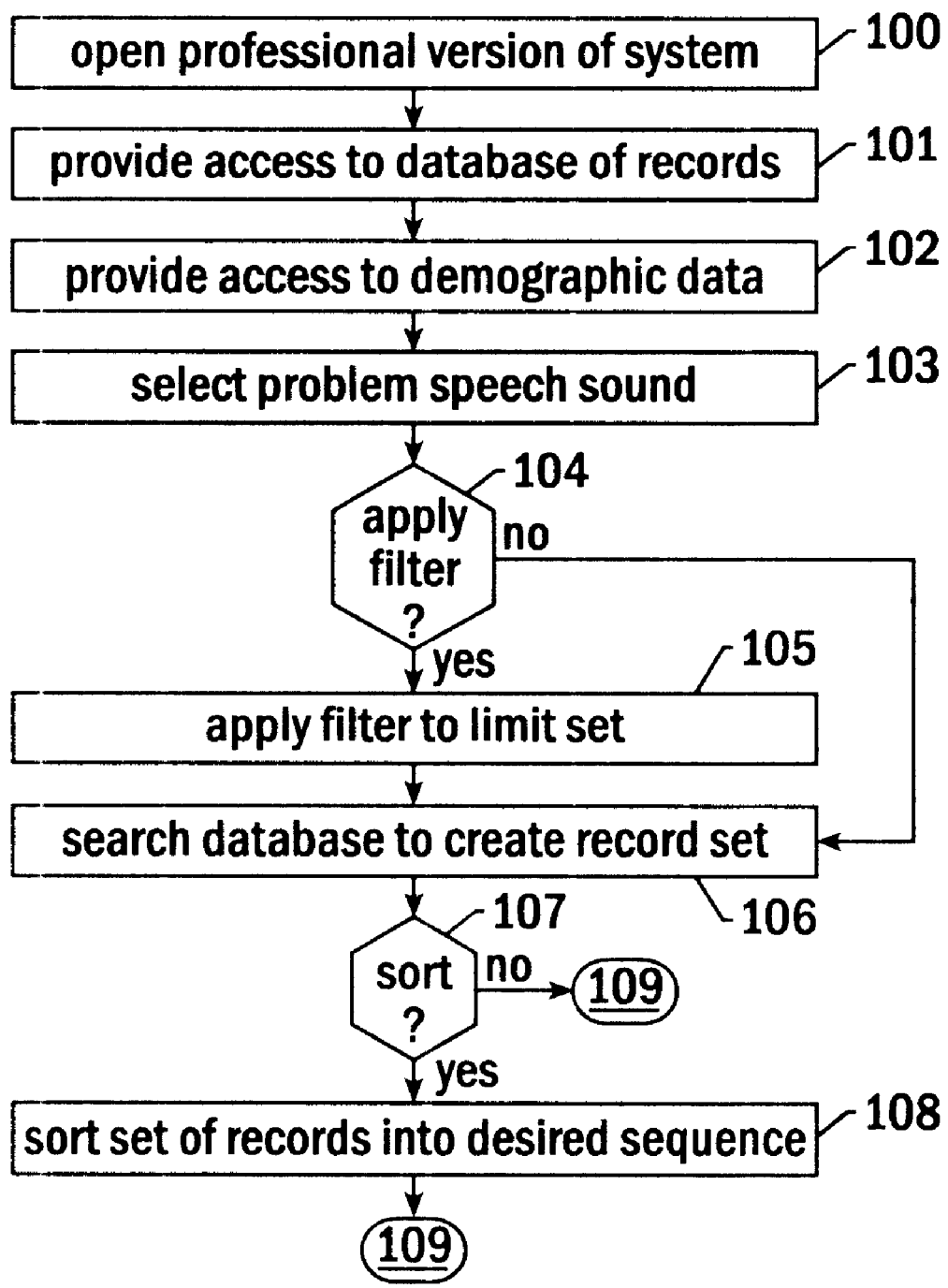
FIGS. 1A, 1B is a flow chart for an exemplary embodiment of the speech therapy method of the invention.
Figure 1B:
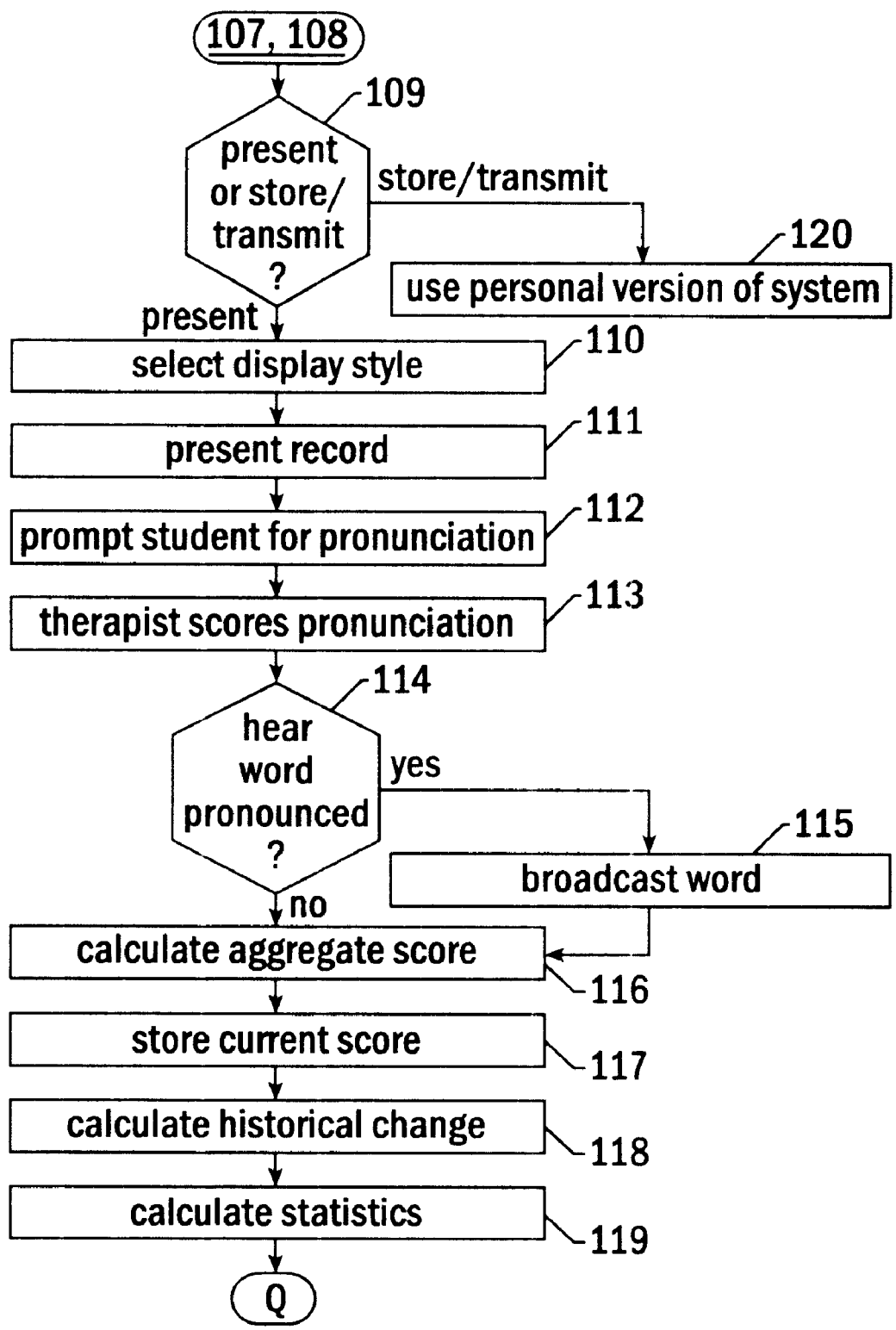
Figure 2:
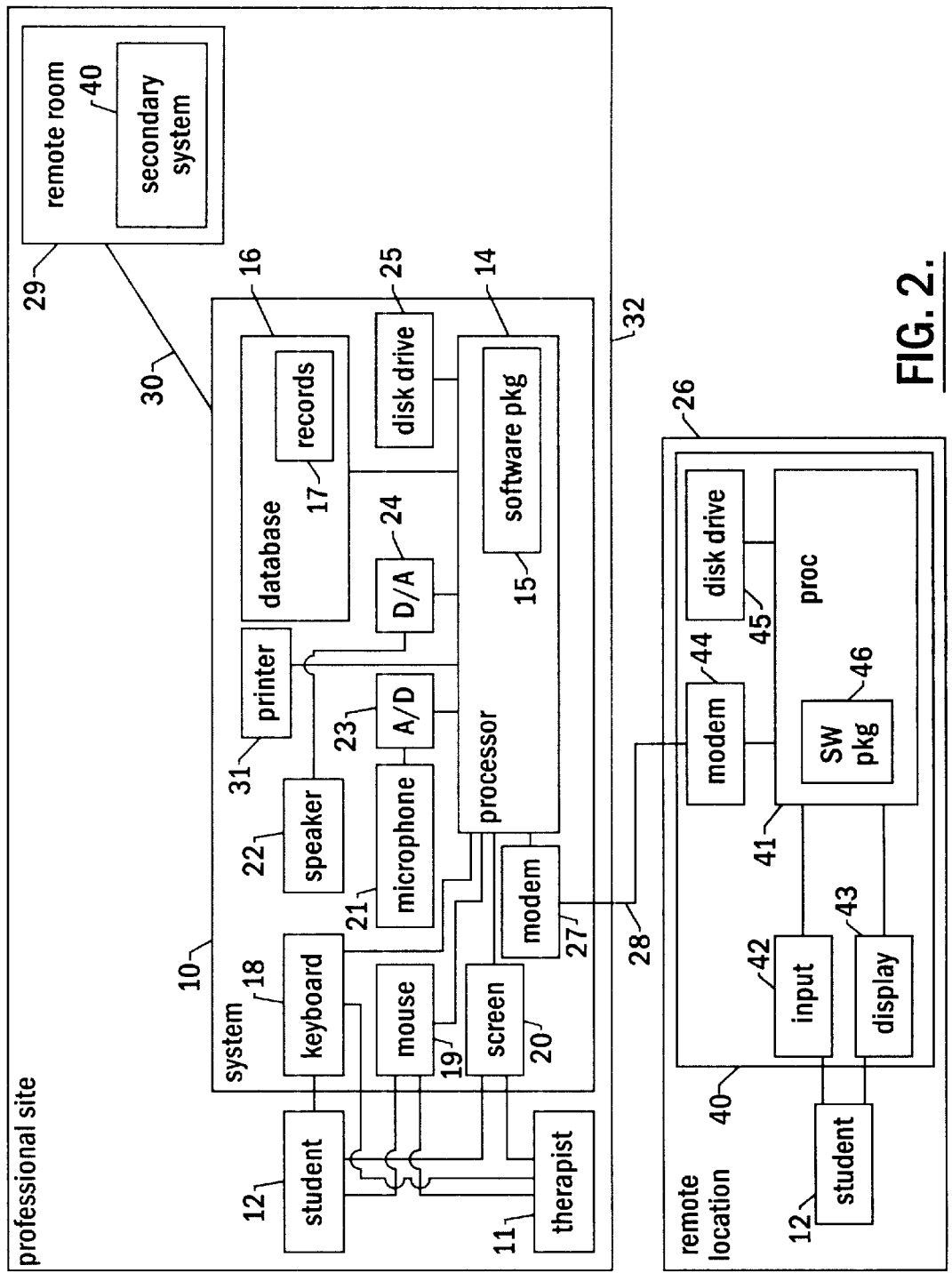
FIG. 2 is a schematic diagram of the speech therapy and analysis system.

A flow chart of an exemplary embodiment of the automated speech therapy/intervention method is given in FIGS. 1A, 1B, and a schematic of the system in FIG. 2. The system and method are also contemplated for use in the acquisition of a language skill as well as in a remediation setting. There are two versions of the system and method: In the "professional" version 10 of the invention (block 100), typically two people who will be referred to as "therapist" 11 and "student" 12 are present, although this is not intended as a limitation. This version is contemplated for use in such settings 32 as a hospital, clinic, rehabilitation center, school, or private facility. In the "personal" version 40 of the invention, the "student" 12 may be working alone, or in the presence of a nonprofessional such as a parent. The therapist 11 may be, for example, a speech therapist or a teacher; the student 12 may be a user who is learning a second language or a school attendee who is being tested for, or who is already known to have, an articulation problem or phonological disorder.

The method comprises the steps of providing access to an electronic database that includes a plurality of records (block 101). Each record comprises a word, a picture representative of the word, and a recommended pronunciation of the word. In an alternate embodiment, the record may also include a digitized video clip to represent motion or a verb to impart a concept of action. In another embodiment the record may further include a digitized sound that is associated with the word. For example, the record for the word dog might contain a picture of a dog, a video clip of a dog running, and/or a barking sound. It is believed that such multiple stimuli appeal to a multiplicity of cognitive areas, thereby optimizing the student's improvement.

Each record may further contain data useful for performing sorting functions, such as at least one category and/or concept. An exemplary set of categories comprises: animals, art, babies, celebrations, global images, environment, family, food, garden, health and exercise, home, leisure, medical, money, music, pets, play, school, shopping, signs/symbols, sports, technical, vacations, and work. An exemplary set of concepts comprises: activities, objects, places, people, ideas, and events. The record also typically comprises a vocabulary level associated with the word and a length of the word.

The method next comprises the step of inputting or accessing previously input demographic information for the student (block 102). Then a problem speech sound that is desired to be improved upon is selected that is known from a prior diagnosis (block 103). The problem speech sound may be selected from a group consisting of a phoneme and a "feature." The feature comprises at least one of a place, a manner, and a voicing characteristic. Searching on a feature yields matches in all positions of words. The database is electronically searched (block 106) for records containing words that include the problem speech sound to generate a set of records. A filter may be applied if desired (block 104) to further limit the set (block 105), including selecting a category or concept, using the demographic information to limit the set, such as eliminating words that are intended for students over 7 years of age for a 5-year-old student, setting a desired vocabulary level, or selecting a word length.

If desired (block 107), the set of records may also be sorted (block 108) in various ways to produce a desired sequence, including, but not limited to, putting the words in alphabetical order, random order, or some other chosen sequence. In a preferred embodiment, all the words in the database contain at least one of the letters "r," "l" and "s," since these are known to present a problem most frequently.

For a professional therapy session, a decision may be made whether to present the set of records or store/transmit them (block 109). If the former, the set of records is next presented sequentially to the student in the predetermined sequence on a display device (block 111), and the student is prompted to pronounce the word (block 112). The display style may be selected (block 110) from a word only, a picture only, or a word plus a picture.

If the student can read, he or she can use the displayed word to form a pronunciation; if the student cannot yet read, or cannot read the currently presented language, the picture will also aid in acquisition of reading skills as well as pronunciation.

In the professional setting, the therapist scores the student's pronunciation (block 113) by inputting, for example, "correct," "incorrect," "skip," or "re-present," which will record an indication to re-present the record at a later time, such as after all the other items in the set have been presented. The student or therapist can also elect (block 114) to hear the word pronounced (block 115) in a recommended manner by making an appropriate selection on an input device.

The scores are received by the system, and an aggregate score is calculated (block 116) for the problem speech sound. The database also comprises a historical record of all sessions for each of the students, and the database is then accessed to store the current score thereinto (block 117). The therapist may choose to calculate a historical change (block 118) from previously saved scores to provide an indication of the student's progress. Such scores may also be used to calculate statistics (block 119) for a group of students, using, for example, a demographic filter.

The "personal version" of the system and method does not accept scoring, nor is there a database from which sets of records may be created. Rather, the professional version is adapted to download a selected set of records onto a storage medium, such as a diskette, or to transmit the set of records to a remote site (block 109). Such a remote site may comprise, but is not intended to be limited to, a room remote from the main processor accessible via intranet, or a different building accessible via internet. This version then enables the student to perform (block 120) the steps in blocks 110–112 and 115 as desired on his or her own.

The system 10, as schematically illustrated in FIG. 2, comprises a processor 14, on which are resident the software package 15 of the present invention adapted to perform the functions as outlined above and a database 16 comprising the plurality of records 17 and demographic and historical data on the users 12. An input device is in communication with the processor 14 that has means for selecting a problem speech sound. Such means may comprise any of the devices known in the art such as a keyboard 18 or pointing device such as a mouse 19 or touch screen. A display device such as a display screen 20 is also in communication with the processor 14.

Optional elements that are also in communication with the processor 14 may include a microphone 21 and a speaker 22, both under processor 14 control, as well as means for performing analog-to-digital 23 and digital-to-analog 24 conversions. The system 10 also has means for transferring records from the database to a storage medium such as a disk drive 25, under control of the software 15, or to a remote site such as another location 26 via a modem 27 over the internet 28 or such as another room 29 at the same location via an intranet 30. A printer 31 under processor control may also be provided for furnishing a hard copy of any portion of the session as desired.

A secondary system 40 for use of the personal version of the invention at the remote location 26, 29 comprises a processor 41, input device 42 and display device 43 in communication with the processor 41, and either or both of a modem 44 for receiving a set of records and a storage device reader 45 for reading a stored set of records. The software package 46 for this version is adapted to read the records, present them to the student 12 sequentially, and prompt the student 12 to pronounce the word associated with the record.

Figure 3A:
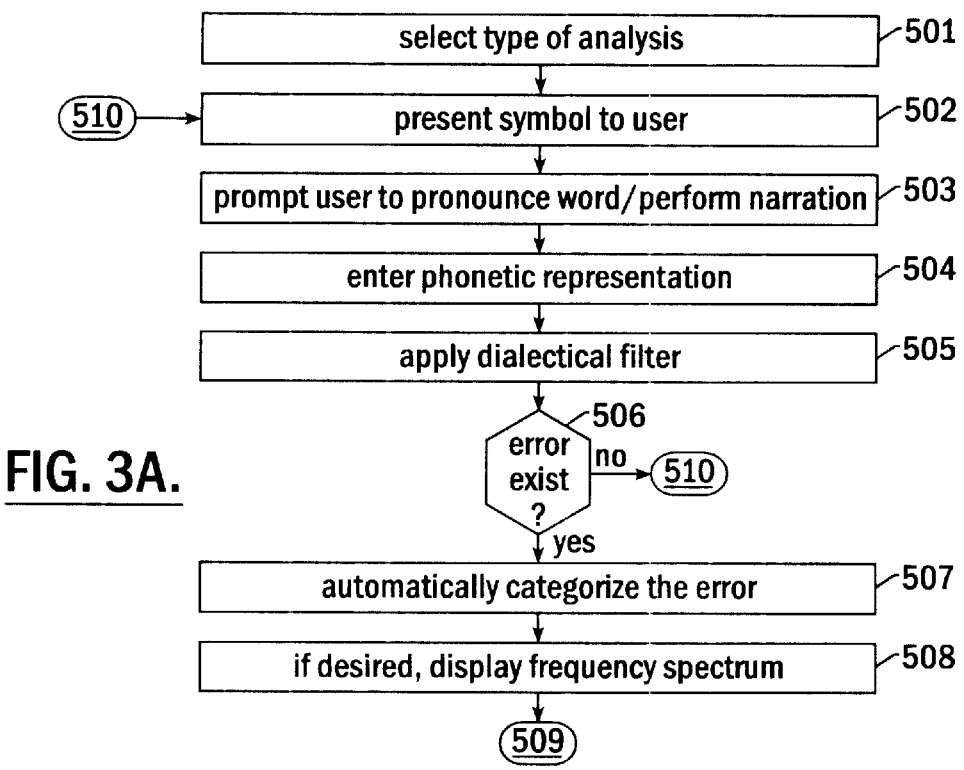
FIGS. 3A, 3B is a flow chart for an exemplary embodiment of the speech analysis method of the invention.
Figure 3B:
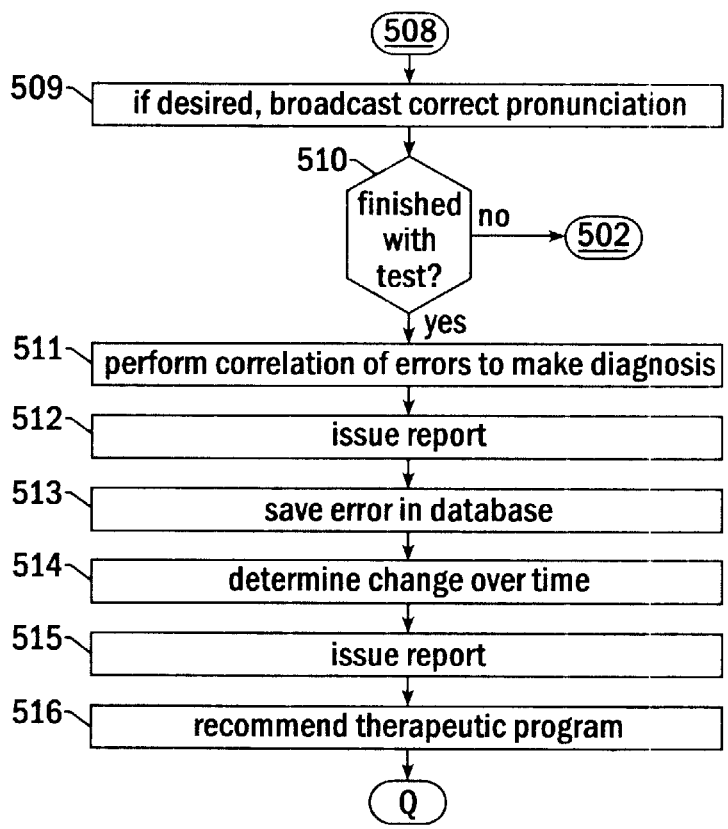

A flow chart of an exemplary embodiment of the automated speech therapy/intervention method is given in FIGS. 3A, 3B. The schematic of the system is substantially the same as that in FIG. 2. The method comprises the steps of selecting the type of evaluation desired to be performed (block 501): screening, single word analysis, "deep" test, or connected speech analysis. The screening, or pre-evaluation, comprises the steps of presenting to a user a symbol representative of a word (block 502) and prompting the user to pronounce the word represented by the symbol into a microphone in signal communication with a processor (block 503). The symbol presentation may comprise, for example, a picture on a display screen, although this is not intended as a limitation. The therapist then enters a phonetic representation of the user pronunciation into the processor (block 504).

Figure 4:
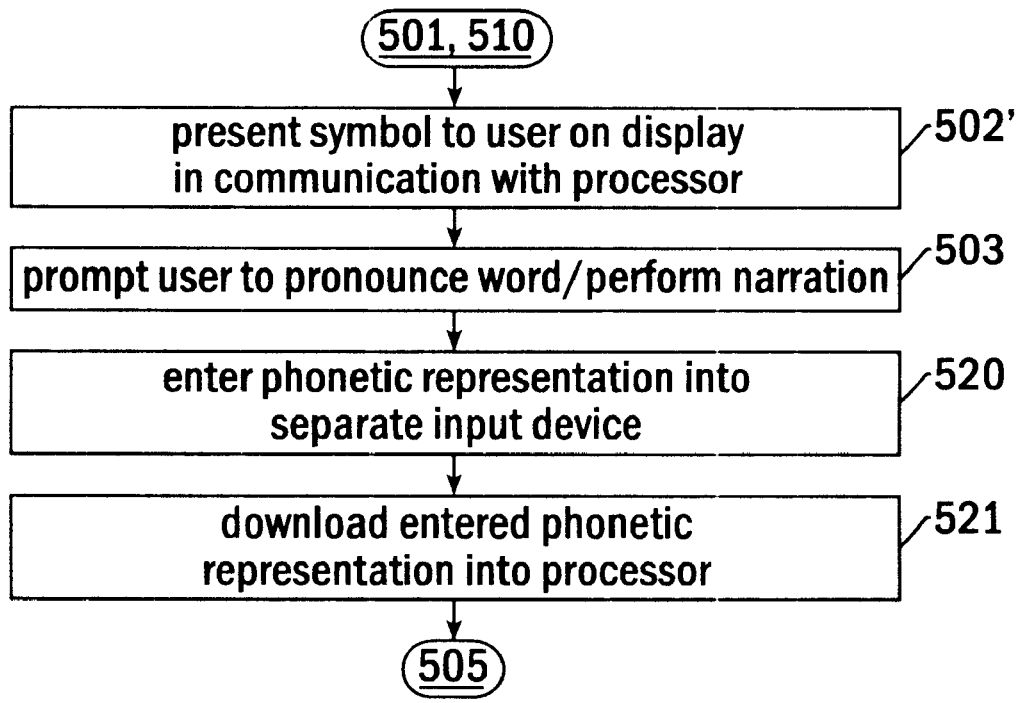
FIG. 4 is a section of a flow chart for another embodiment of the speech analysis method of the invention.
Figure 5:
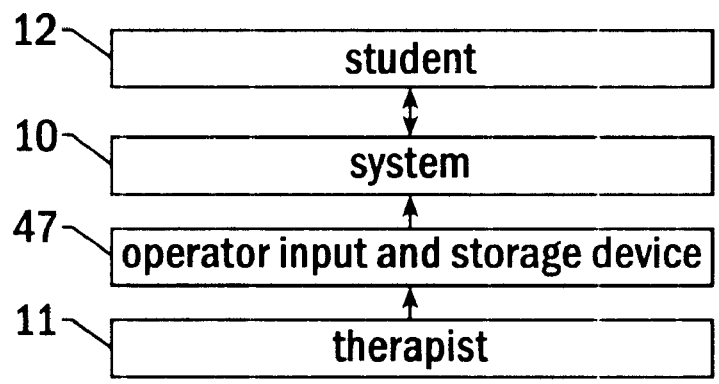
FIG. 5 is a schematic diagram of an alternate embodiment of the speech analysis system.
Figure 6A:
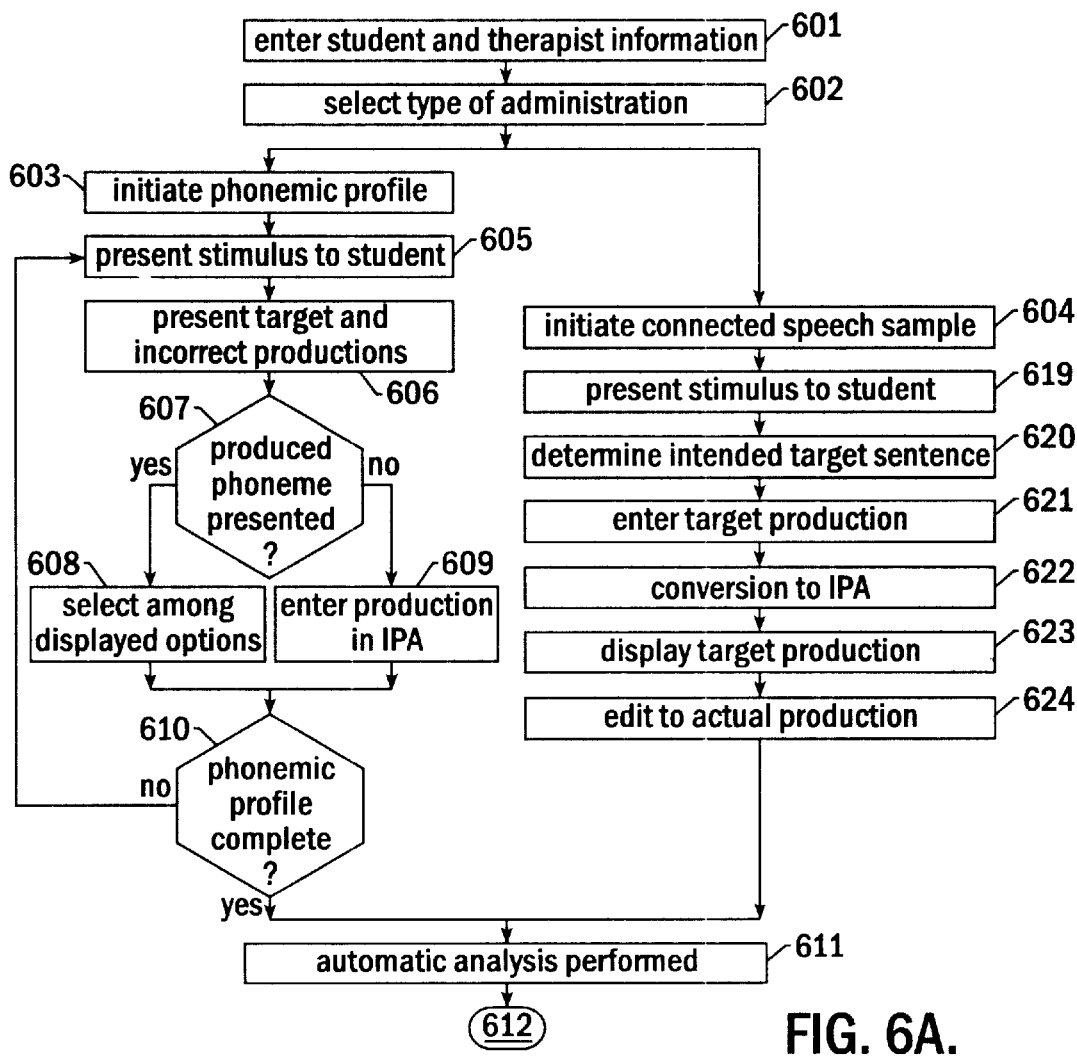
FIGS. 6A, 6B is a flow chart for an additional embodiment of the speech analysis method of the invention.
Figure 6B:
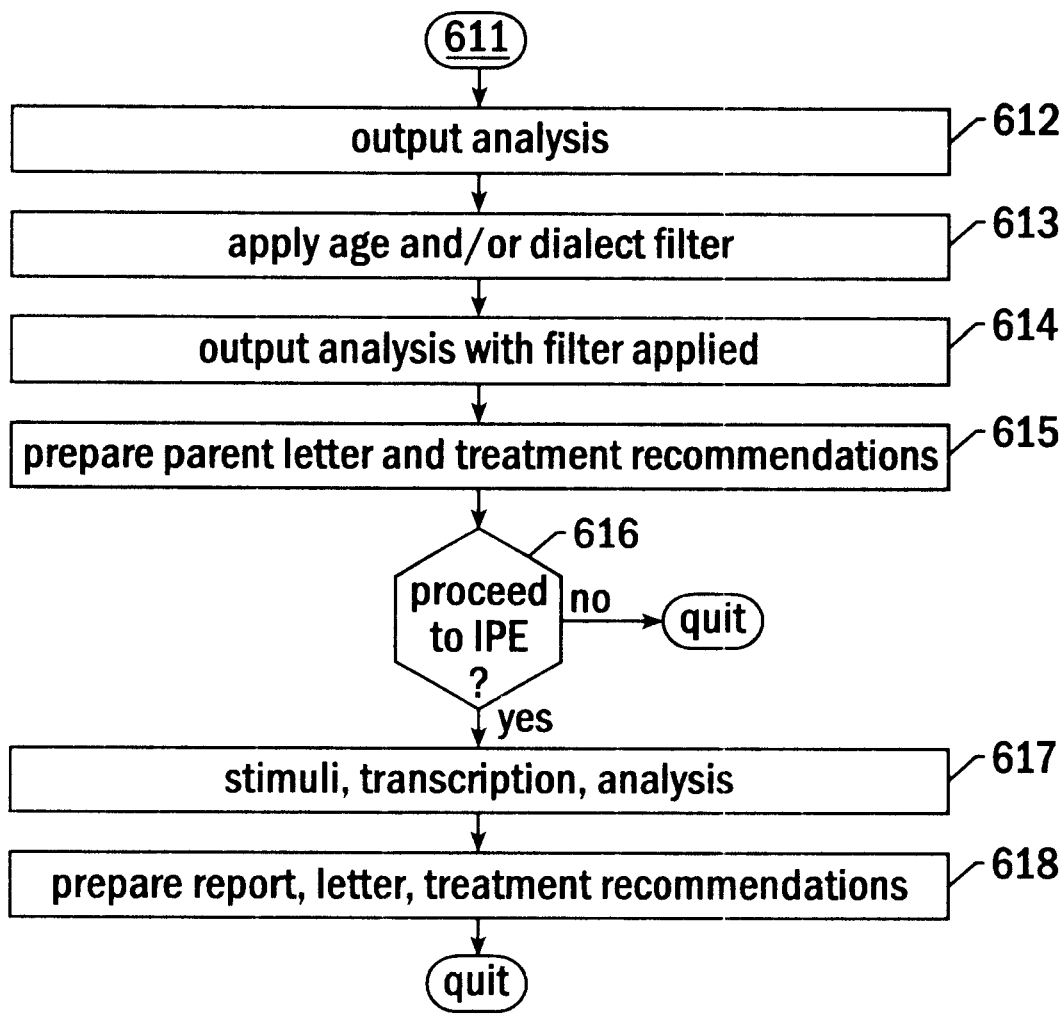
Figure 7:
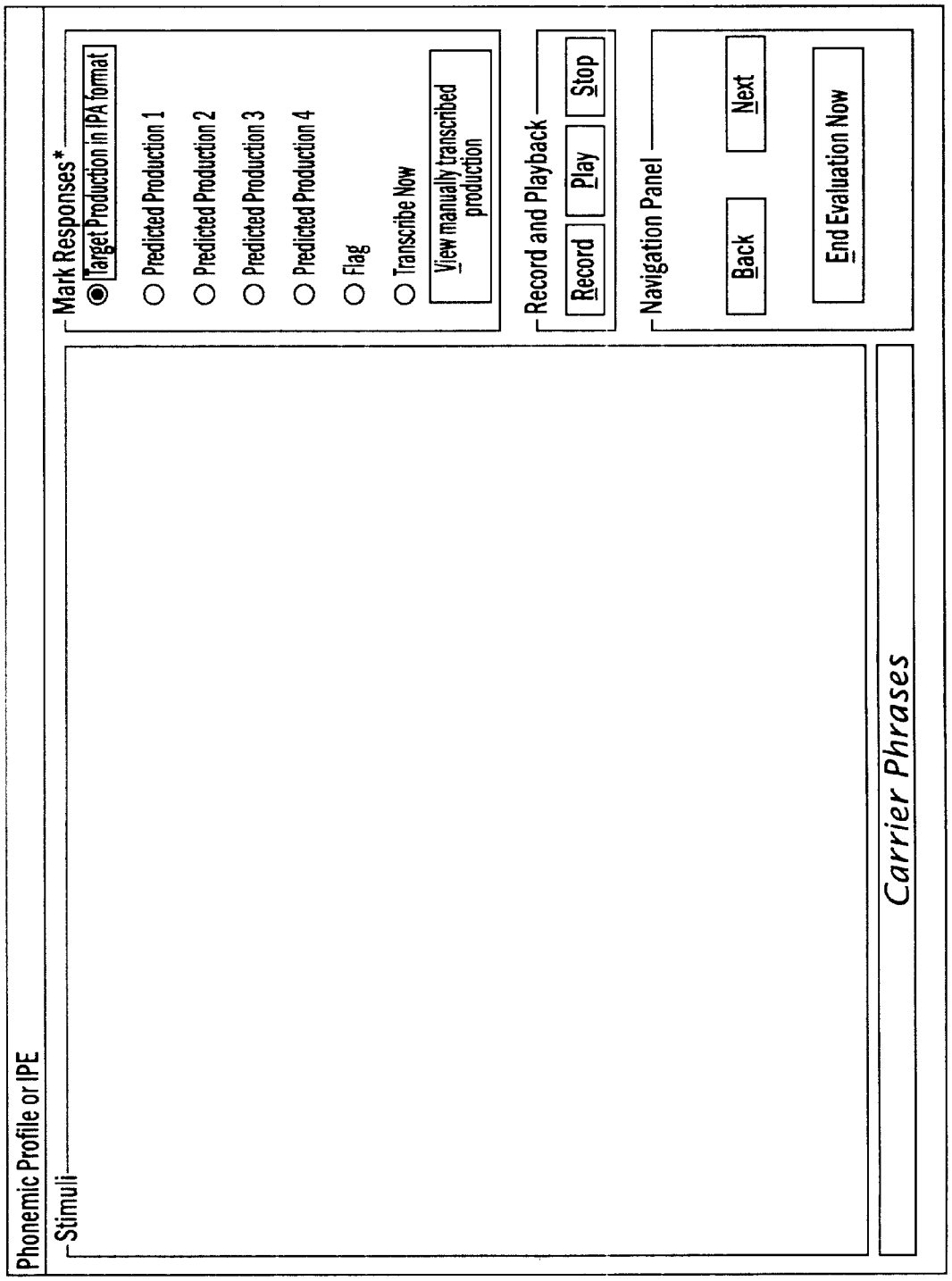
FIG. 7 is an exemplary phonemic profile or individualized phonological evaluation screen.
Figure 8:
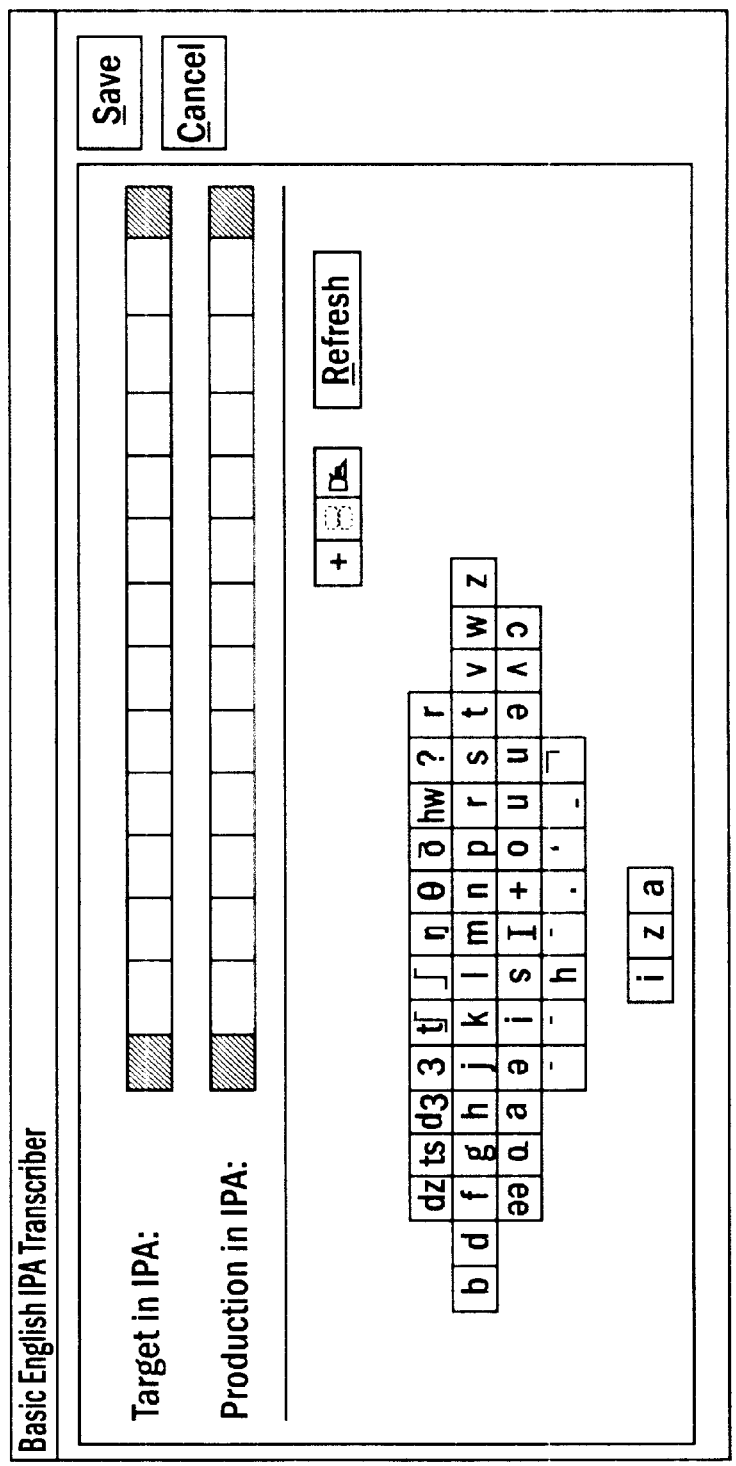
FIG. 8 is an exemplary basic IPA production transcription screen.

In an alternate embodiment of the method, the altered portion of which is illustrated in FIG. 4, the therapist enters the phonetic representation of the user pronunciation into a separate operator input and storage device 47, such as, but not intended to be limited to, a personal data assistant (block 520). At a later time, the user pronunciation data are downloaded into the processor (block 521) to complete the steps of the method.

A schematic of the system (FIG. 5) illustrates the addition of the operator input and storage device 47, which is connectable to the system 10 when desired for downloading data into the processor 14 that has been entered thereinto by the therapist 11.

The advantages of this embodiment include the user and the operator being able to use separate pieces of hardware, thereby eliminating physical restraints imposed by attempting to share equipment. Further, during the session the user cannot view the operator's scoring information, which may inhibit the user. In addition, the operator's hardware may retain data for downloading into more than one processor if desired for subsequent collection and analysis.

In both embodiments, the software installed upon the processor then automatically determines whether an error exists in the user pronunciation (block 506). The determination may additionally include the application of a dialectical filter (block 505) that is adapted to discriminate between that which is deemed to be a true error and a predetermined normal dialect word pronunciation. If an error exists, the software automatically categorizes the error (block 507). An error may be, for example, a substitution, a mispronunciation, or an omission. These steps are repeated a predetermined number of times n, for example, 20 times (block 510).

It may then be desired to perform the "deep test," which may be performed with the knowledge gained from a pre-evaluation as above or de novo. If the pre-evaluation has been performed, the software automatically generates a set of symbols, wherein each symbol is representative of a word containing at least one of the errors determined in the pre-evaluation. Then the steps as above are performed using the generated set of symbols, and an evaluation is made of articulation errors for the whole set.

If a single word is desired to be analyzed for, the steps in blocks 502–509 are performed once for the desired word.

Once a word has been pronounced and the phonetic representation entered into the processor, the therapist may decide to display a frequency spectrum of the user's pronunciation (block 508). If desired, a sample of a correct pronunciation of the word may be broadcast via a speaker in signal communication with the processor (block 509).

When a plurality of words have been tested, the evaluating step also comprises automatically recognizing an underlying commonality by correlating the errors detected. This pattern recognition permits the software to achieve an overarching diagnosis of a problem speech sound (block 511).

Following the error categorization, if desired, a report can be issued detailing the user's error(s) (block 512). Additionally, the error may be saved in a database that is accessible by the processor (block 513). If a previous entry for this user already exists, which is determined by a search, the error found in the present test may be compared with an error previously found, and a change over time determined for that user (block 514), to note whether an improvement has occurred. Again, if desired, a report may be issued (block 515) as to the change determined.

An additional feature of this invention is the ability, once a categorization has been made of an error, of recommending a therapeutic program to address the error (block 516). Such a recommendation formulation may comprise, for example, creating a set of records as detailed above in FIGS. 1A–2.

If connected speech analysis is desired to be performed, the "symbol" comprises a motion picture representative of an action, and the user is prompted to provide a narration on the action into a microphone in signal communication with a processor. The therapist then enters a phonetic representation of the user's pronunciation of the narration into the processor. Software resident in the processor automatically determines whether an error exists in the user pronunciation, and, if an error exists, automatically categorizes the error.

Another aspect of the present invention relates to a system and method for transcribing student-produced speech by a therapist (FIGS. 6A–15), for analyzing the transcribed speech, and for producing a report and recommendations based upon the analysis. The steps of the method are illustrated in flow-chart form in FIGS. 6A, 6B, and exemplary screens, letters, and reports in FIGS. 7–15. The system of the invention is substantially as illustrated schematically in FIG. 2 within the "professional site" 32.

The method of the present invention includes the steps of entering student and therapist information (block 601), such as demographic information. The therapist 11 is then permitted to choose (block 602) between administering a "phonemic profile" (block 603) or a "connected speech sample" (block 604), and also whether or not to record the student's production. In either case, the therapist 11 may select between basic English International Phonetic Alphabet (IPA) or full IPA.

If the phonemic profile selection is made, a stimulus is presented to the student (block 605), such as by displaying a picture on the screen 20 to elicit a particular sound, which may comprise one or more phonemes. For example, a picture of a cat would elicit the student to say "cat."

For each stimulus, the correct target word (e.g., "cat") and predicted incorrect productions (e.g., "tat") are displayed on the screen 20 to the therapist 11 (block 606) in, for example, IPA format. The therapist 11 is then permitted, if a match occurs (block 607), to select from among the displayed options based upon the student's production (block 608) or to enter the student's production in IPA format (block 609). The selection of block 608 is made, for example, by a "point and click" method using the mouse 19 on a screen such as FIG. 7; the production entering of block 609 may also be made by a "point and click" method using the mouse 19 on a transcribing screen such as in FIG. 8.

Figure 10:
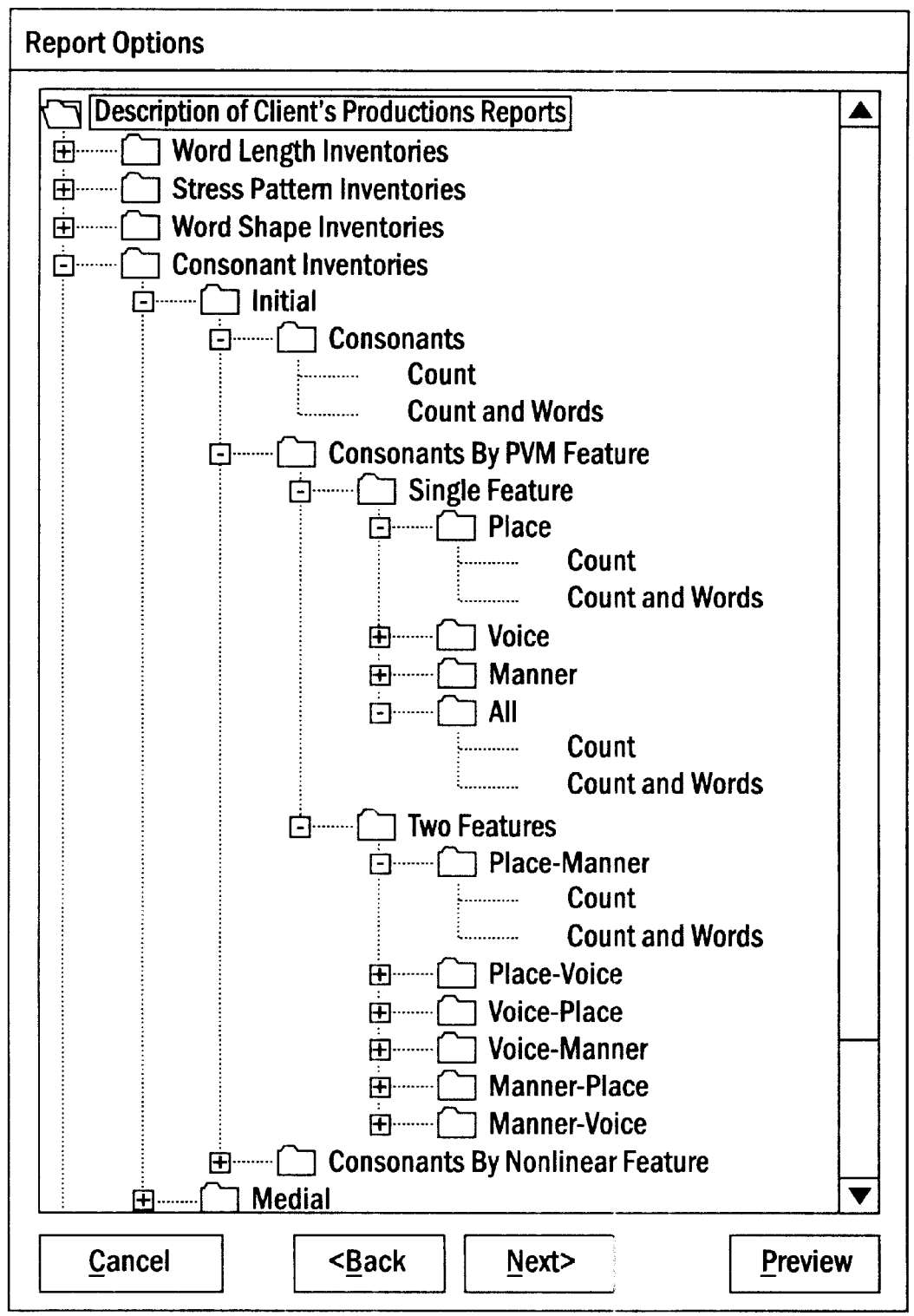
FIG. 10 is an exemplary student production report option selection screen.

Once the phonemic profile is complete (block 610), the software package 15 performs an automatic analysis for the student (block 611), displays the results of the analysis on the screen 20 or prints the analysis results on the printer 31 (block 612), applies a filter such as an age and/or a dialect filter (block 613), and displays the results of the analysis with applied filter(s) on the screen 20 or prints the analysis results on the printer 31 if one or more filters were applied (block 614). Then the analysis is used to prepare a narrative parent letter and/or report that includes problem sounds (FIG. 9) and recommendations for treatment (block 615). An example of available student production report selections is shown in FIG. 10. Additional report selections include descriptions of student productions; word length, stress pattern, and word shape inventories; and consonant and vowel inventories.

If desired (block 616), the therapist 11 can proceed to an individualized phonological evaluation (IPE). The stimuli for this evaluation are determined based upon the results of the phoneme profile, and there are four levels of evaluation possible, as will be reflected in the treatment reports to be discussed in the following. For example, if the student pronounced "tat" for "cat," words such as "can," "call," "cad," or "cast" may be selected for presentation to the student 12. Once again, stimuli, transcription, and analyses are performed analogous to blocks 605–611 (block 617), with the analysis based upon both the phonemic profile and the IPE, and a report, a letter, and treatment recommendations provided analogous to blocks 612–615 (block 618). Exemplary treatment suggestion reports for four levels of IPEs are shown in FIGS. 11A–11E, 12A–12E, 13A–13B, and 14.

If the connected speech option was selected (block 604), a stimulus is presented to the student 12 (block 619), such as a video clip on the screen 20 or other external stimulus. The therapist 11 determines an intended target sentence (block 620) as the student's production is made. The therapist 11 enters the target production on the keyboard 18 in orthographic format (block 621; FIG. 15), and the system 15 converts it into IPA format (block 622). The student's production is defaulted to be the target production (block 623), and the therapist 11 edits the production fields in order to convert it into the actual student production (block 624).

Once the editing is complete, the production is analyzed (block 611), with a comparison being made between the target and actual productions. Reports are then displayed (block 612) on the student's production and the comparison. The remaining blocks are substantially the same as with the phonemic profile.

It may be appreciated by one skilled in the art that additional embodiments may be contemplated, including alternate forms of presentation of the symbols and sounds.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for use by a therapist to transcribe speech of a student comprising the steps of:
   (a) prompting a student to produce a word comprising a plurality of phonemes orally;
   (b) displaying a correct production of the word to a therapist;
   (c) displaying a phonetic representation of at least one incorrect production of the word to the therapist;
   (d) permitting the therapist to make an electronic selection from among the displayed correct and incorrect production representations based upon the student-produced word; and
   (e) performing an automatic analysis of a student speech production difficulty based upon an incorrect production representation selection.

2. The method recited in claim 1, wherein the incorrect production representation displaying step comprises displaying a plurality of incorrect production representations.

3. The method recited in claim 2, further comprising the step of, if the student-produced word does not match one of the displayed correct and incorrect production representations, permitting the therapist to enter the student-produced word one phoneme at a time into a processor.

4. The method recited in claim 3, wherein the therapist is permitted to enter each phoneme in International Phonetic Alphabet form.

5. The method recited in claim 1, further comprising the step, following the permitting step, of applying a filter to the incorrect production representation relating to at least one of age and dialect.

6. The method recited in claim 1, further comprising the steps, following the analysis performing step, of collecting a plurality of words from a database based upon the incorrect production representation selection and repeating steps (a)–(d) for each of the collected words.

7. A method for use by a therapist to transcribe speech of a student comprising the steps of:
   prompting a student to orally produce a narration comprising a plurality of phonemes by selecting a stimulus for eliciting connected speech;
   permitting the therapist to enter the student-produced narration one phoneme at a time into a processor;
   performing via software resident in the processor an automatic analysis of a student speech production difficulty based upon at least one incorrect production representation in the entered narration.

8. A system for transcribing speech of a student comprising:
   a processor;
   display means in signal communication with the processor for:
      prompting a student to produce a word comprising a plurality of phonemes orally;
      displaying a phonetic representation of a correct production of the at word to a therapist; and
      displaying a phonetic representation of at least one incorrect production of the word to the therapist;
   input means in signal communication with the processor for permitting the therapist to select from among the displayed phonetic representations of correct and incorrect productions based upon the student produced; and
   software means resident on the processor having a code segment adapted to perform an automatic analysis of a student speech production difficulty based upon at least one incorrect production representation in the entered word.

9. The system recited in claim 8, wherein the display means comprises a screen.

10. The system recited in claim 8, wherein the input means comprises a pointing device.

11. A method for use by a therapist to transcribe speech of a student comprising the steps of:
   prompting a student to pronounce a word comprising a plurality of phonemes orally;
   displaying a phonetic representation of a correct production of the word to a therapist;

displaying a phonetic representation of at least one incorrect production of the word to the therapist;

permitting the therapist to select and perform a method of recording the student-produced word from among the steps of:

making an electronic selection from among the displayed phonetic representations of correct and incorrect productions based upon the student-produced word; and entering the student-produced word symbolically into a processor; and automatically performing an analysis of a student speech production difficulty based upon the recorded student-produced word.

12. The method recited in claim 11, wherein the prompting step comprises selecting a stimulus for eliciting connected speech.

13. The method recited in claim 11, wherein the incorrect production phonetic representation displaying step comprises displaying a phonetic representation of a plurality of incorrect productions.

14. The method recited in claim 11, wherein, if the selected recording method comprises entering the student-produced word, permitting each phoneme of the word in International Phonetic Alphabet form.

15. The method recited in claim 12, further comprising the step, following the permitting step, of applying a filter to the phonetic representation of the incorrect production relating to at least one of age and dialect.

16. The method recited in claim 12, further comprising the step, following the analysis performing step, of collecting a plurality of words from a database based upon the phonetic representation of the incorrect production.

17. A system for transcribing speech of a student comprising:

a processor;

display means in signal communication with the processor for:

prompting a student to produce a word orally;

displaying a phonetic representation of a correct production of the word to a therapist; and displaying a phonetic representation of at least one incorrect production of the word to the therapist;

a first input device in signal communication with the processor adapted to permit the therapist to make an electronic selection from among the displayed correct and incorrect production representations based upon the student-produced word;

a second input device in signal communication with the processor adapted to permit the therapist to enter the student-produced word symbolically into the processor; and software means resident on the processor having a code segment adapted to perform an automatic analysis of a student speech production difficulty based upon at least one incorrect production representation in the entered word.

18. The system recited in claim 17, wherein the display means comprises a screen.

19. The system recited in claim 17, wherein the first input means comprises a pointing device.

20. The system recited in claim 17, wherein the second input means comprises a keyboard.

21. A method for analyzing a speech problem in a user comprising the steps of:

displaying a symbol to a user, the symbol representative of a word comprising a plurality of phonemes, the displaying step under control of a processor;

prompting a user to pronounce the word orally;

entering the user-pronounced word symbolically into an electronic device;

transmitting the entered symbolic representation of the user-pronounced word to the processor; and automatically analyzing the symbolic representation of the user-pronounced word to determine whether an error exists in the user pronunciation.

22. The method recited in claim 21, further comprising the step of automatically categorizing an existing error.

23. The method recited in claim 22, wherein the automatic analyzing and categorizing steps are under control of software resident in the processor.

24. The method recited in claim 21, wherein the prompting step comprises selecting a stimulus for eliciting connected speech.

25. The method recited in claim 21, wherein the entering step comprises entering the user-pronounced word in phonetic form.

26. The method recited in claim 21, wherein the analyzing step comprises applying a filter to an incorrect pronunciation relating to at least one of age and dialect.

27. The method recited in claim 21, further comprising the steps of repeating the displaying, prompting, entering, and transmitting steps a plurality of times, and wherein the analyzing step comprises correlating incorrect pronunciations and diagnosing a problem speech sound from the correlation.

28. Computer software for analyzing a speech problem in a user comprising:

a code segment for displaying a symbol to a user on a display device, the symbol representative of a word comprising a plurality of phonemes;

a code segment for prompting a user to pronounce the word orally;

a code segment for receiving a symbolic representation of the user-pronounced word; and a code segment for analyzing the symbolic representation of the user-pronounced word to determine whether an error exists in the user pronunciation.

29. The computer software recited in claim 28, further comprising a code segment for automatically categorizing an existing error.

30. The computer software recited in claim 28, wherein symbolic representation of the user-pronounced word comprises a phonetic form.

31. The computer software recited in claim 28, wherein the analyzing code segment includes a filter for application to an incorrect pronunciation relating to at least one of age and dialect.

32. The computer software recited in claim 28, further comprising a code segment for directing a repetition of the code segments for displaying, prompting, entering, and transmitting a plurality of times, and wherein the analyzing code segment comprises a code segment for correlating incorrect pronunciations and diagnosing a problem speech sound from the correlation.

33. A system for analyzing a speech problem in a user comprising:

a processor;

a display device;

a therapist input device adapted to receive a symbolic representation of a word comprising a plurality of phonemes, the therapist input device comprising means for transmitting data to the processor;

software means resident on the processor for:
- displaying a symbol to a user on the display device, the symbol representative of a word comprising a plurality of phonemes;
- prompting a user to pronounce the word orally;
- receiving a symbolic representation of the user-pronounced word from the therapist input device; and
- automatically analyzing the symbolic representation of the user-pronounced word to determine whether an error exists in the user pronunciation.

34. The system recited in claim 33, wherein the software means is further adapted to automatically categorize an existing error.

35. The system recited in claim 33, wherein symbolic representation of the user-pronounced word comprises a phonetic form.

36. The system recited in claim 33, wherein the analyzing portion of the software means includes a filter for application to an incorrect pronunciation relating to at least one of age and dialect.

37. The system recited in claim 33, wherein the software means is further adapted to direct a repetition of the displaying, prompting, entering, and transmitting a plurality of times, to correlate incorrect pronunciations, and to diagnose a problem speech sound from the correlation.

* * * * *